(12) United States Patent
Li

(10) Patent No.: US 9,946,920 B1
(45) Date of Patent: Apr. 17, 2018

(54) SENSING ELEMENT AND FINGERPRINT SENSOR COMPRISING THE SENSING ELEMENTS

(71) Applicant: IMAGE MATCH DESIGN INC., Hsinchu County (TW)

(72) Inventor: Hsinlun Li, Hsinchu County (TW)

(73) Assignee: IMAGE MATCH DESIGN INC., Hsinchu County (TW)

(*) Notice: Subject to any disclaimer, the term of this patent is extended or adjusted under 35 U.S.C. 154(b) by 28 days.

(21) Appl. No.: 15/360,874

(22) Filed: Nov. 23, 2016

(51) Int. Cl.
*G06K 9/28* (2006.01)
*G06K 9/00* (2006.01)

(52) U.S. Cl.
CPC ....... *G06K 9/00087* (2013.01); *G06K 9/0002* (2013.01); *G06K 9/00053* (2013.01)

(58) Field of Classification Search
CPC .................................................. G06K 9/0002
See application file for complete search history.

(56) References Cited

U.S. PATENT DOCUMENTS

| 6,636,053 | B1* | 10/2003 | Gozzini | G01D 5/24 324/658 |
| 7,864,992 | B2 | 1/2011 | Riedijk et al. | |
| 8,115,497 | B2 | 2/2012 | Gozzini | |
| 2003/0102874 | A1* | 6/2003 | Lane | G06K 9/0002 324/662 |
| 2004/0212599 | A1 | 10/2004 | Cok et al. | |
| 2006/0153431 | A1* | 7/2006 | Ando | G06K 9/00067 382/124 |
| 2015/0254491 | A1* | 9/2015 | Mo | G06F 3/0416 345/174 |
| 2016/0117017 | A1* | 4/2016 | Kremin | G01R 27/2605 345/174 |

FOREIGN PATENT DOCUMENTS

| CN | 105094477 A | 11/2015 |
| TW | 201439865 A | 10/2014 |
| TW | M508714 U | 9/2015 |

OTHER PUBLICATIONS

Office Action dated Nov. 15, 2017 from Taiwan Patent Office for counterpart application 106110787.
English abstract translation of the Office Action dated Nov. 15, 2017 from Taiwan Patent Office for counterpart application 106110787.

* cited by examiner

*Primary Examiner* — Brian Werner
(74) *Attorney, Agent, or Firm* — WPAT, P.C., Intellectual Property Attorneys; Anthony King

(57) ABSTRACT

A fingerprint sensor is disclosed. The fingerprint sensor includes a substrate, a sensing electrode, a shielding plate, a first pair of conductive plates and an amplifier. The sensing electrode is configured to detect a capacitance in response to a touch event on the fingerprint sensor, and configured to selectively receive or not receive an input voltage. The shielding plate is configured to selectively receive the input voltage or is coupled to a reference voltage level. The first pair of conductive plates includes a first plate selectively coupled to the sensing electrode. The amplifier includes an inverting terminal coupled to a second plate of the first pair of conductive plates, and a non-inverting terminal to receive a voltage that is a fraction of the input voltage. The sensitivity of the fingerprint sensor is directly proportional to the input voltage.

20 Claims, 10 Drawing Sheets

US 9,946,920 B1

SENSING ELEMENT AND FINGERPRINT SENSOR COMPRISING THE SENSING ELEMENTS

TECHNICAL FIELD

The present disclosure is generally related to a sensing element and, more particularly, to a fingerprint sensor comprising the sensing elements.

BACKGROUND

Touch devices or touchscreens have been commonly used in electronic devices such as smart phones, personal computers and game consoles. Some touch devices not only provide a user friendly interface and bring users convenience, but also work in conjunction with a fingerprint sensor for the purpose of data security. For example, the fingerprint sensor can determine whether a user is authorized to use the electronic device by verifying the user's identity in the form of fingerprint. Therefore, touch sensitivity has been the subject of interest in developing advanced touch devices.

SUMMARY

Embodiments of the present invention provide a fingerprint sensor. The fingerprint sensor includes a substrate, a sensing electrode over the substrate, a shielding plate between the sensing electrode and the substrate, a first pair of conductive plates and an amplifier. The sensing electrode is configured to detect a capacitance in response to a touch event on the fingerprint sensor, and configured to selectively receive or not receive an input voltage. The shielding plate is configured to selectively receive the input voltage or is coupled to a reference voltage level. The first pair of conductive plates includes a first plate selectively coupled to the sensing electrode. The amplifier includes an inverting terminal coupled to a second plate of the first pair of conductive plates, and a non-inverting terminal to receive a voltage that is a fraction of the input voltage. The sensitivity of the fingerprint sensor is directly proportional to the input voltage.

In an embodiment, the first pair of conductive plates defines a capacitor having a capacitance significantly larger than a first parasitic capacitance between the sensing electrode and the substrate, and a second parasitic capacitance between the sensing electrode and the shielding plate.

In another embodiment, the sensitivity of the fingerprint sensor is independent of the second parasitic capacitance.

In still another embodiment, the fingerprint sensor further includes a second pair of conductive plates coupled between the inverting terminal and an output of the amplifier. Moreover, the second pair of conductive plates defines a feedback capacitor, and the sensitivity of the fingerprint sensor is inversely proportional to a capacitance of the feedback capacitor.

In yet another embodiment, the feedback capacitor includes a first capacitor coupled between the inverting terminal and an output of the amplifier, and a second capacitor selectively coupled in parallel with the first capacitor.

In yet still another embodiment, a capacitance of the second capacitor is a predetermined times of that of the first capacitor.

In an embodiment, the sensitivity of the fingerprint sensor is directly proportional to a ratio of (Cfb1+Cfb2)/Cfb1, wherein Cfb1 and Cfb2 represent a capacitance each of the first capacitor and the second capacitor, respectively.

In another embodiment, the second plate of the first pair of conductive plates is selectively coupled to the inverting terminal of the amplifier.

In still another embodiment, the sensitivity S of the fingerprint sensor is defined by the following equation:

$$S = \frac{V5 \times (Cfinger + cp1)}{Cfb}$$

where V5 represents the input voltage, Cfinger represents a capacitance detected by the sensing electrode, Cp1 represents a capacitance associated with the sensing electrode, and Cfb represents a capacitance between an inverting terminal and an output of the amplifier.

In yet another embodiment, the fingerprint sensor further includes an offset cancellation circuit to trim off Cp1.

Embodiments of the present invention provide a circuit. The circuit includes a sensing electrode configured to detect a capacitance in response to a touch event on a fingerprint sensor, a node associated with the sensing electrode, the node configured to selectively receive an input voltage, an amplifier including an inverting terminal, and a non-inverting terminal to receive a voltage that is a fraction of the input voltage, and a capacitor configured to selectively couple to the node and selectively couple to the inverting terminal. The sensitivity of the fingerprint sensor is directly proportional to the input voltage.

The foregoing has outlined rather broadly the features and technical advantages of the present invention in order that the detailed description of the invention that follows may be better understood. Additional features and advantages of the invention will be described hereinafter. It should be appreciated by persons having ordinary skill in the art that the conception and specific embodiments disclosed may be readily utilized as a basis for modifying or designing other structures or processes for carrying out the same purposes of the present invention without departing from the spirit and scope of the invention as set forth in the appended claims.

BRIEF DESCRIPTION OF THE DRAWINGS

Details of one or more embodiments of the disclosure are set forth in the accompanying drawings and the description below. Other features and advantages of the disclosure will be apparent from the description, drawings and claims. Throughout the various views and illustrative embodiments, like reference numerals are used to designate like elements. Reference will now be made in detail to exemplary embodiments illustrated in the accompanying drawings.

DETAIL DESCRIPTION

In order to make the disclosure comprehensible, detailed steps and structures are provided in the following description. Obviously, implementation of the disclosure does not limit special details known by persons skilled in the art. In addition, known structures and steps are not described in detail, so as not to limit the disclosure unnecessarily. Preferred to embodiments of the disclosure will be described below in detail. However, in addition to the detailed description, the disclosure may also be widely implemented in other embodiments. The scope of the disclosure is not limited to the detailed description, and is defined by the claims.

Figure 1:
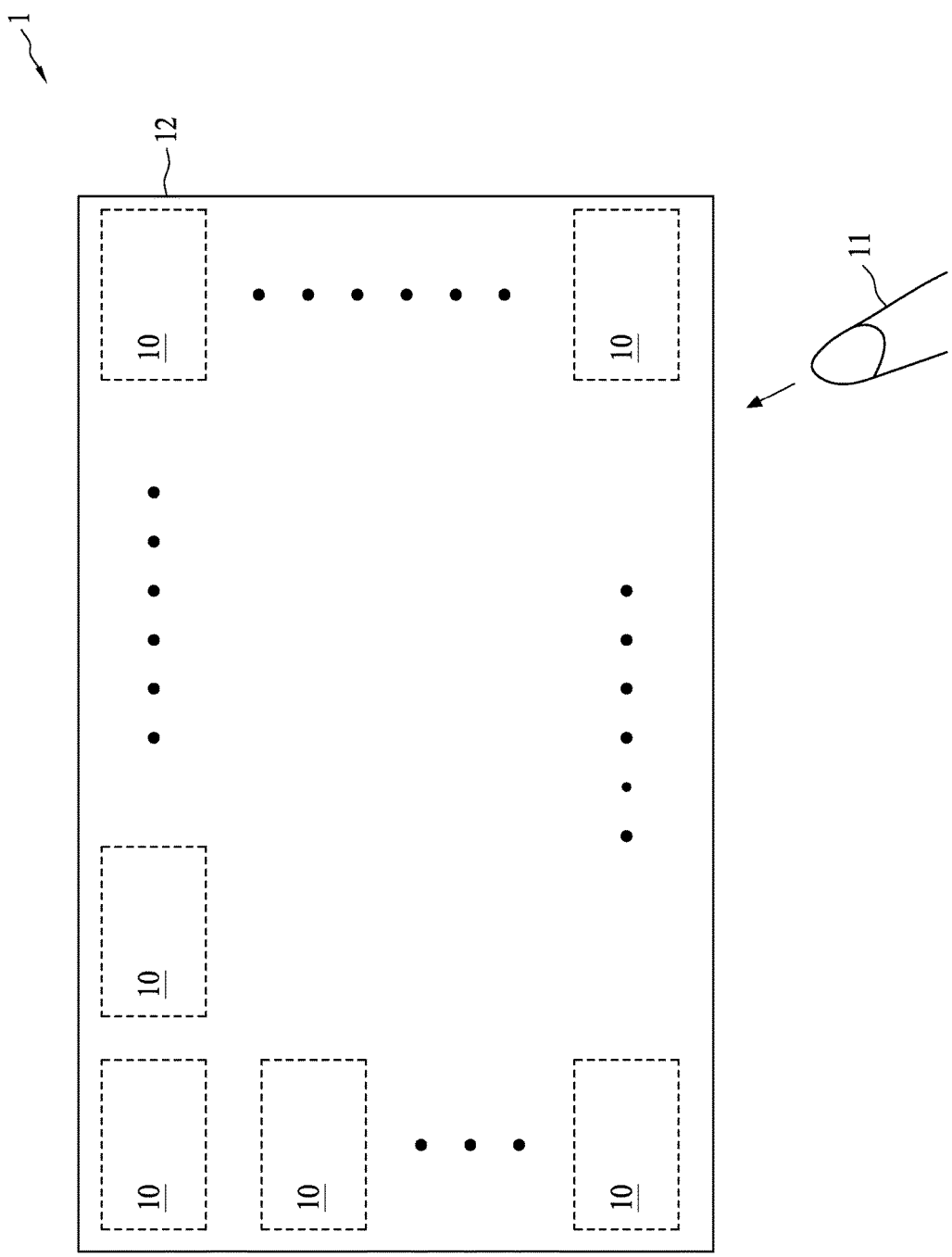
FIG. 1 is a top view of a fingerprint sensor, in accordance with some embodiments of the present invention.

FIG. 1 is a top view of a fingerprint sensor 1, in accordance with some embodiments of the present invention. The fingerprint sensor 1 is adapted to work with an electronic device (not shown), such as a smart phone, a personal computer and a personal digital assistant.

Referring to FIG. 1, the fingerprint sensor 1 includes an array of sensing elements 10, which are covered by a protection layer 12. Each of the sensing elements 10 corresponds to a pixel of the fingerprint sensor 1. The sensing elements 10 are configured to detect a touch event of an object 11, such as a stylus, pen or one or more fingers of a user, when tapping or moving across the surface of the protection layer 12.

Figure 2A:
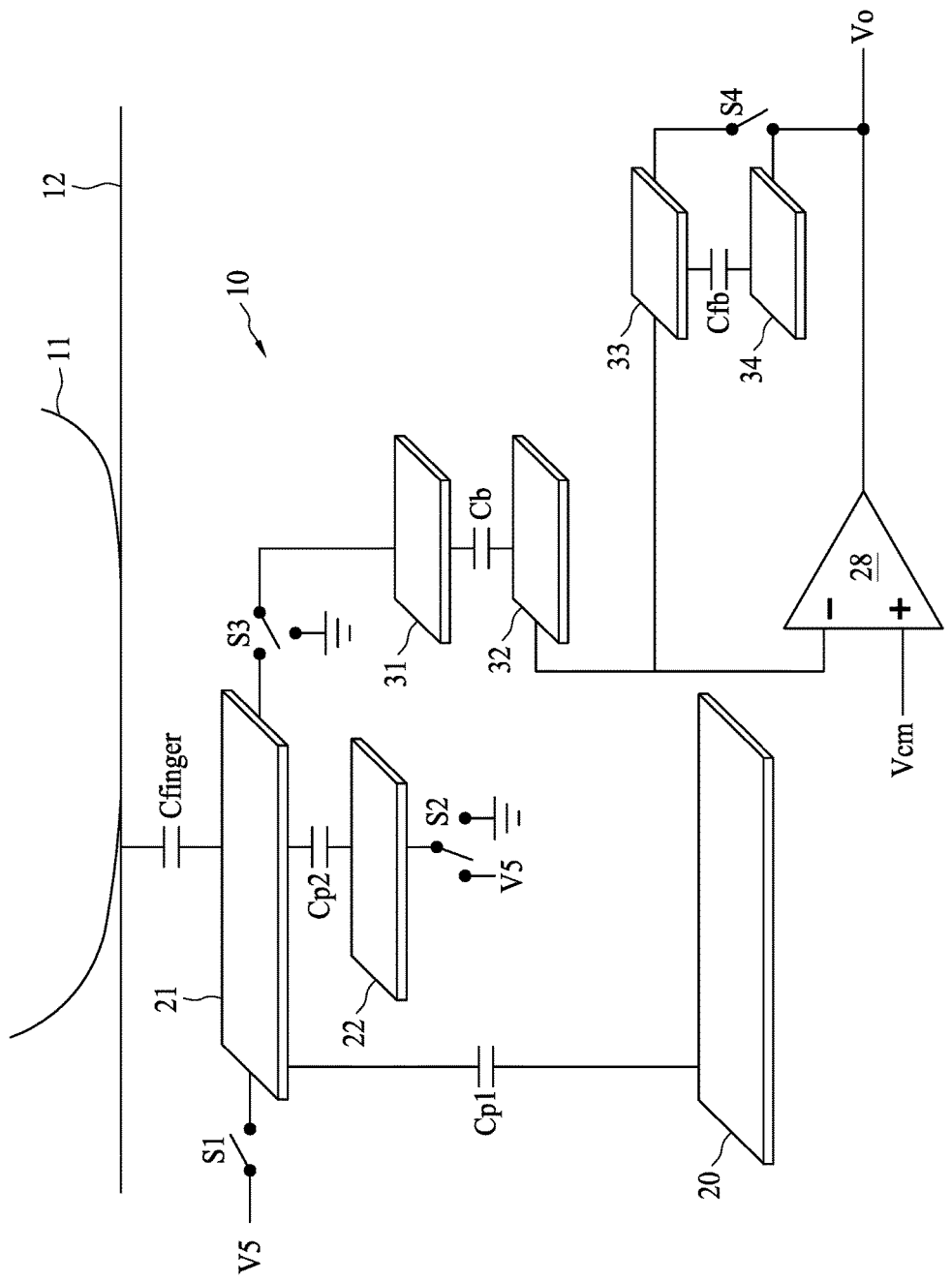
FIG. 2A is a schematic diagram of an exemplary sensing element of the fingerprint sensor shown in FIG. 1, in accordance with an embodiment of the present invention.

FIG. 2A is a schematic diagram of an exemplary sensing element 10 of the fingerprint sensor 1 shown in FIG. 1, in accordance with an embodiment of the present invention.

Referring to FIG. 2A, the exemplary sensing element 10 includes a sensing electrode 21, a shielding plate 22, a first pair of conductive plates including a first plate 31 and a second plate 32, a second pair of conductive plates including a third plate 33 and a fourth plate 34, an amplifier 28 and a set of switches S1, S2, S3 and S4, which are all disposed over or in a substrate 20, as will be discussed in detail below.

The sensing electrode 21, disposed near the protection layer 12, is configured to detect a capacitance Cfinger associated with the object 11 in response to a touch event on the fingerprint sensor 1. Moreover, a first parasitic capacitance Cp1 associated with the sensing electrode 21 exists between the sensing electrode 21 and the substrate 20, and between the current pixel and an adjacent pixel (not shown). For convenience, a same reference numeral or label for a capacitor is also used for its capacitance throughout the specification, and vice versa. For example, while the reference label "Cfinger" as above mentioned refers to a capacitance, as illustrated in FIG. 2A, it may also represent a capacitor having the capacitance.

In addition, the sensing electrode 21 is configured to receive via a first switch S1 an input voltage V5 from a power supply (not shown). In an embodiment, a voltage level of the input voltage V5 ranges from 2.6 volts (V) to 3.6V, for example, approximately 3.3V. Moreover, the power supply may include a battery such as a lithium battery. In that case, no metal frame or metal ring is needed to facilitate excitation of an input voltage signal, which may be relatively cost efficient.

The shielding plate 22 is disposed between the sensing electrode 21 and the substrate 20, and may be immediately adjacent to the sensing electrode 21. The shielding plate 22 is configured to shield or mask the substrate 20 from the sensing electrode 21, or vice versa. Specifically, the shielding plate 22 overlaps the sensing electrode 21 in physical structure so that parasitic capacitance between the sensing electrode 21 and the substrate 20 is decreased, thereby increasing the touch sensitivity. In addition, the shielding plate 22 is selectively coupled to the power supply to receive V5 or coupled to a reference level such as ground via a second switch S2. A second parasitic capacitance Cp2 exists between the sensing electrode 21 and the shielding plate 22. The second parasitic capacitance Cp2, as well as the first parasitic capacitance Cp1, can be estimated by means of simulation at a design stage when a layout of the circuit is available.

The first pair of conductive plates 31 and 32 defines a capacitor Cb, which may have a predetermined capacitance. In the first pair of conductive plates, the first plate 31 is selectively coupled to the sensing electrode 21 or coupled to ground via a third switch S3. In addition, the second plate 32 is coupled to an inverting terminal of the amplifier 28. Although in the present embodiment, the capacitor Cb is formed by a pair of conductive plates, in other embodiments, however, a metal-oxide-semiconductor field-effect transistor (MOSFET) or a similar transistor may be used to serve as the capacitor Cb. Moreover, the capacitance Cb in an embodiment is at least ten times the sum of the capacitances Cfinger, Cp1 and Cp2. As a result, the capacitances Cfinger, Cp1 and Cp2, either alone or even summed together, are considered negligible with respect to the capacitance Cb.

The second pair of conductive plate 33 and 34 defines a capacitor Cfb, which serves as a feedback capacitor for the amplifier 28. In the second pair of conductive plates, the conductive plate 33 is coupled to the inverting terminal of the amplifier 28 and coupled, via a fourth switch S4, to an output Vo of the amplifier 28 and the conductive plate 34. In addition, the conductive plate 34 is coupled to the output Vo of the amplifier 28.

The amplifier 28 is configured to facilitate determination of a fingerprint pattern based on the capacitance Cfinger and the input voltage V5. In the present embodiment, the amplifier 28 includes an operational (OP) amplifier, as illustrated in FIG. 2A. Moreover, the amplifier 28 is disposed in an active region or active layer of the substrate 20, even though for illustration the amplifier 28 as shown appears to be outside the substrate 20. A non-inverting terminal (labeled with a plus sign "+") of the amplifier 28 receives a voltage Vcm. The voltage Vcm is a fraction of the input voltage V5. In an embodiment, the magnitude of Vcm is a half of the input voltage V5, and may be approximately 1.65V in the case of V5 being approximately 3.3V. An inverting terminal (labeled with a minus sign "−") of the amplifier 28 is connected to the conductive plate 32 of the second pair. Further, an output Vo of the amplifier 28 is connected to the conductive plate 34 and, via the fourth switch S4, to the conductive plate 33.

Since the input impedance of an OP amplifier is ideally indefinite, the voltage drop across the input impedance is deemed to be zero and thus both input terminals are at the same potential. In other words, the two input terminals of the amplifier 28 are virtually shorted to each other, a characteristic called "virtual short." If the non-inverting terminal of the amplifier 28 is Vcm, then due to the "virtual short" between the two input terminals, the inverting terminal is also connected to Vcm.

Each of the switches S1 to S4 may include a transistor formed in the active region of the substrate 20. A controller or microprocessor (not shown) is used to control the released or closed state of the switches S1 to S4. Operation of the switches S1 to S4 will be discussed in detail with reference to FIGS. 3A and 3B.

In a fingerprint sensor, the capacitance Cfinger depends on the geometric property of a contact surface of an object during a touch event. For example, a ridge portion of the object produces a larger capacitance than a valley portion. However, as would be more obvious in an advanced fingerprint sensor, the capacitance difference may not be large enough for a fingerprint sensor to distinguish a ridge from a valley or vice versa. Moreover, parasitic capacitances in the fingerprint sensor may even lessen the difference and worsen the sensing result. In the present disclosure, the parasitic capacitances such as Cp2 and those associated with the input terminals of the amplifier 28 may adversely affect the sensitivity of the fingerprint sensor 1. It is desirable that the parasitic effect can be alleviated or even eliminated.

Figure 2B:
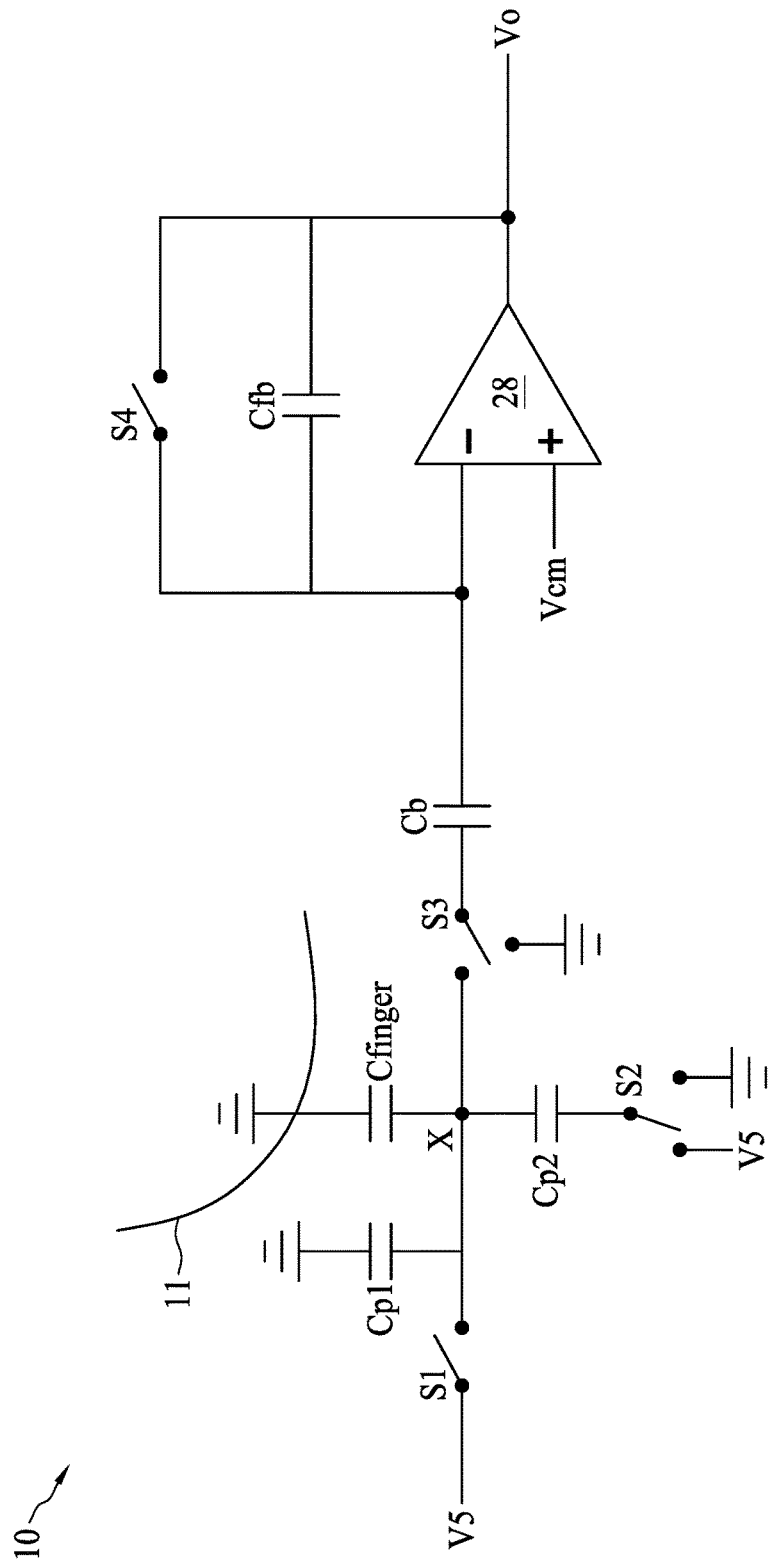
FIG. 2B is a circuit diagram of an equivalent circuit of the exemplary sensing element shown in FIG. 2A, in accordance with some embodiments of the present invention.

FIG. 2B is a circuit diagram of an equivalent circuit of the exemplary sensing element 10 shown in FIG. 2A, in accordance with some embodiments of the present invention.

Referring to FIG. 2B, the capacitor Cfinger is coupled between a node labeled X and the object 11. The object 11 is deemed as ground in the equivalent circuit. The first parasitic capacitor Cp1 is coupled between the node X and the substrate 20. Also, the substrate 20 is deemed as ground in the equivalent circuit. Node X receives the input voltage V5 when the first switch S1 is closed, and is disconnected from the input voltage V5 when the first switch S is released.

In addition, the second parasitic capacitor Cp2 is coupled between the node X and via the second switch S2 to V5 or ground. Specifically, one end of the second parasitic capacitor Cp2 is coupled to node X, while the other end of the second parasitic capacitor Cp2 receives the input voltage V5 or is grounded as selected by the second switch S2. Likewise, one end of the capacitor Cb is coupled to the inverting terminal of the amplifier 28, while the other end of the capacitor Cb is coupled to node X or is grounded as selected by the third switch S3.

The capacitor Cfb connected in parallel with the fourth switch S4 is coupled between the inverting terminal and the output Vo of the amplifier 28. As a result, the capacitor Cfb provides a feedback capacitance Cfb when the fourth switch S4 is released, and is bypassed when the fourth switch S4 is closed.

Figure 3A:
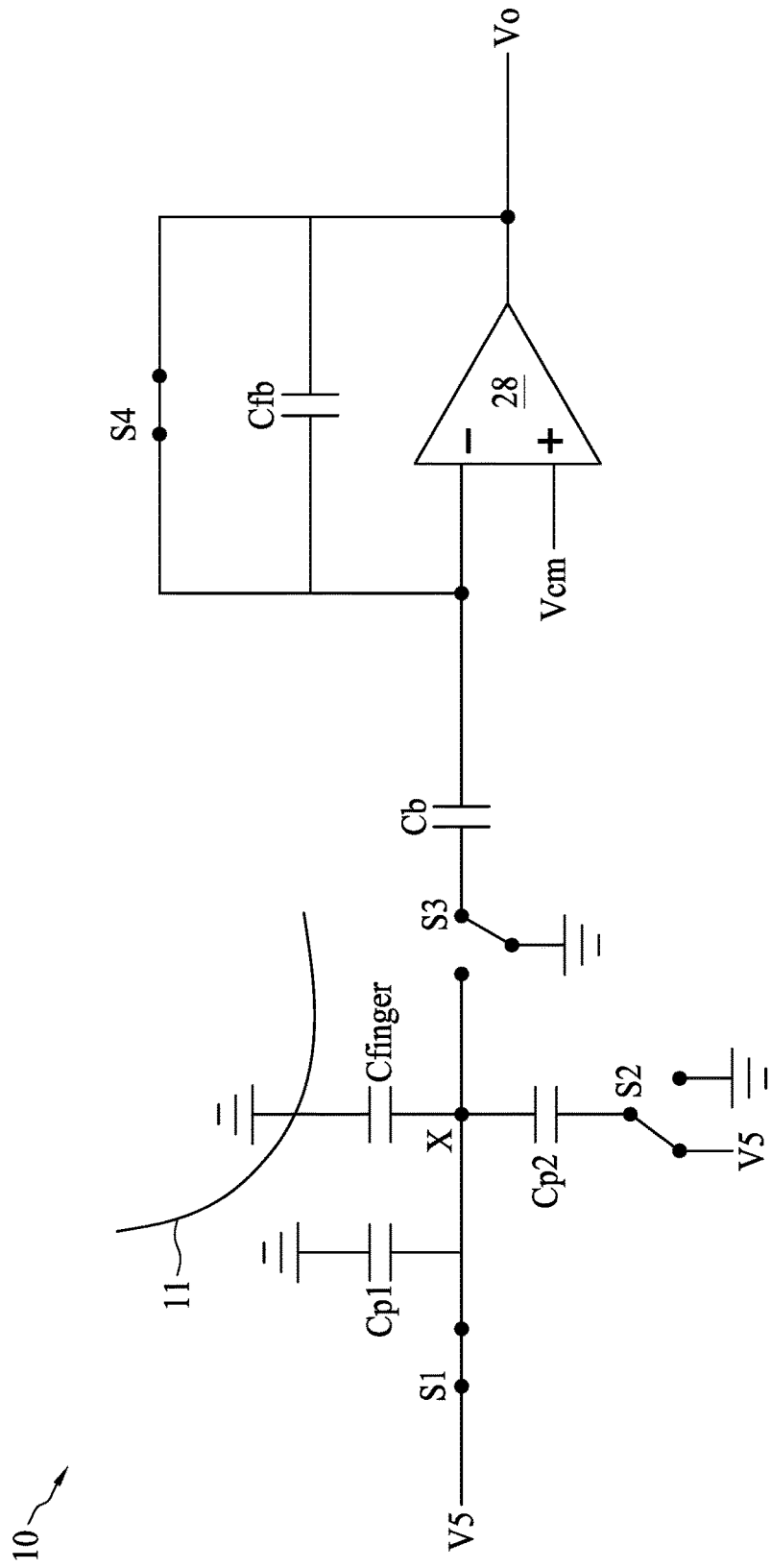
FIG. 3A is a circuit diagram of the exemplary sensing element shown in FIG. 2A, operating in a first phase in the presence of a touch event, in accordance with some embodiments of the present invention.

FIG. 3A is a circuit diagram of the exemplary sensing element 10 shown in FIG. 2A, operating in a first phase in the presence of a touch event, in accordance with some embodiments of the present invention.

Referring to FIG. 3A, during the first phase the first switch S1 is closed, the second switch S2 selects V5, the third switch S3 is coupled to ground, and the fourth switch S4 is closed. Since the first switch S1 is closed, node X receives V5 and therefore the voltage level at node X, denoted as Vx, is pulled to V5. Meanwhile, since both ends of the second parasitic capacitor Cp2 are coupled to V5, no voltage is applied across the second parasitic capacitor Cp2 and thus no charge can be stored therein. As far as node X is concerned, since node X is connected from the capacitor Cb, charge Qx1 from the input voltage V5 is stored in the capacitors Cp1 and Cfinger, as expressed in equation (1) below.

$$Qx1 = V5 \times (Cfinger + Cp1) \quad \text{equation (1)}$$

Moreover, since the fourth switch S4 is closed, the capacitor Cfb is bypassed. As far as the inverting terminal of the amplifier 28 is concerned, since the capacitor Cb is disconnected from node X, charge Qamp1 from the inverting terminal that is virtual-shorted to Vcm is stored in the capacitor Cb, as expressed in equation (2) below.

$$Qamp1 = Vcm \times Cb \quad \text{equation (2)}$$

Figure 3B:
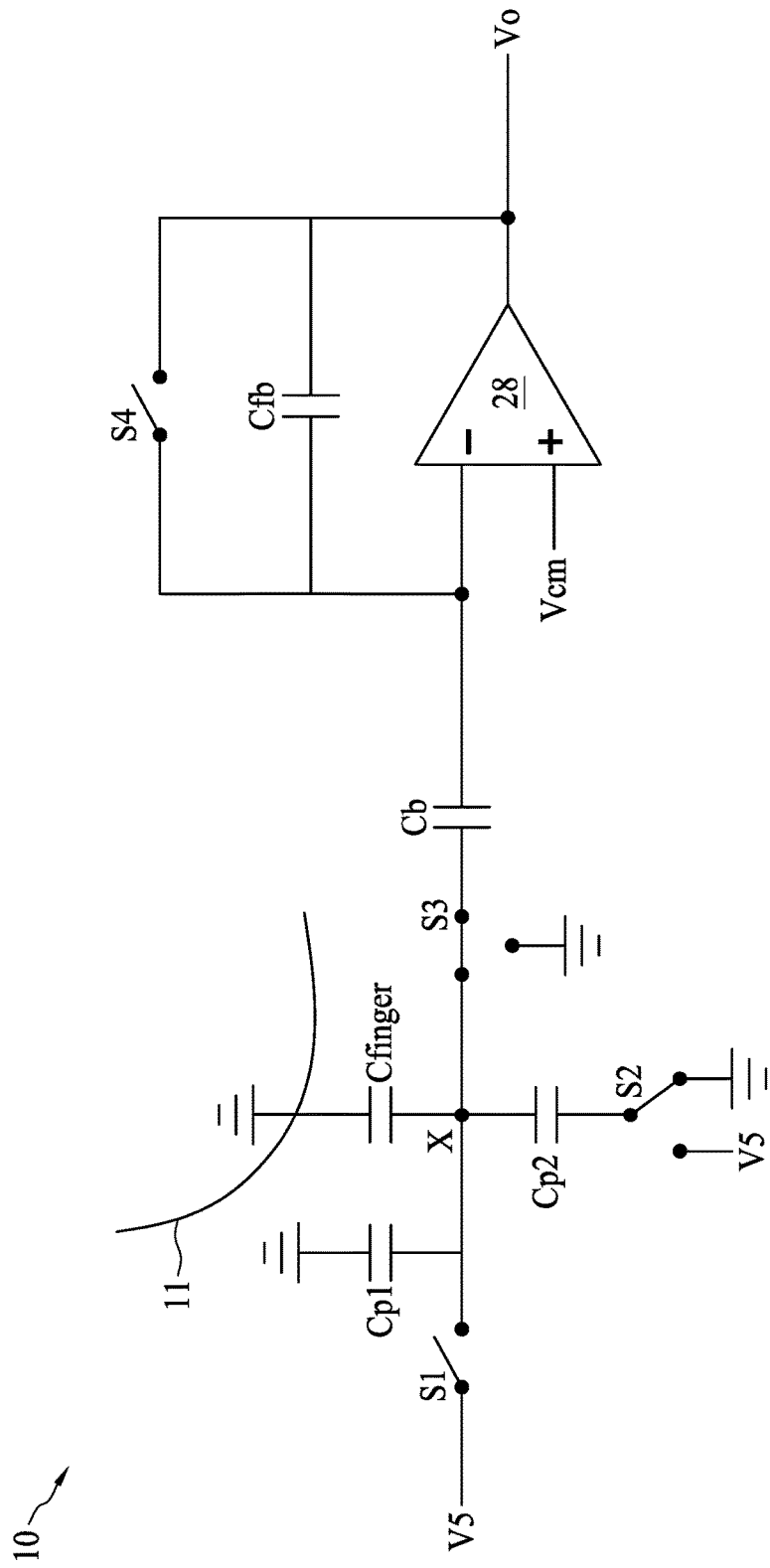
FIG. 3B is a circuit diagram of the exemplary sensing element shown in FIG. 2A, operating in a second phase in the presence of a touch event, in accordance with some embodiments of the present invention.

FIG. 3B is a circuit diagram of the exemplary sensing element 10 shown in FIG. 2A, operating in a second phase in the presence of a touch event, in accordance with some embodiments of the present invention.

Referring to FIG. 3B, during the second phase the first switch S1 is released, the second switch S2 is coupled to ground, the third switch S3 is coupled to node X, and the fourth switch S4 is released. Since the first switch S1 is released, node X is disconnected from the input voltage V5. In addition, since the second switch S2 is coupled to ground, a voltage Vx is applied across the second parasitic capacitor Cp2 and thus the charge previously stored in the capacitors Cp1 and Cfinger in the first phase is shared by the capacitor Cp2. Moreover, since the third switch S3 is coupled to node X, the charge previously stored in the capacitors Cp1 and Cfinger is also shared by the capacitor Cb. As far as node X is concerned, with the inverting terminal being still kept at Vcm, charge Qx2 due to charge sharing among the capacitors Cp1, Cfinger, Cp2 and Cb can be expressed in equation (3) as follows.

$$Qx2 = Vx \times (Cfinger + Cp1 + Cp2 + Cb) \quad \text{equation (3)}$$

Moreover, since the fourth switch S4 is released, the capacitor Cfb is not bypassed. In addition, since the capacitor Cb is coupled to node X, the charge previously stored in the capacitors Cb in the first phase is shared by the capacitor Cfb. As far as the inverting terminal of the amplifier 28 is concerned, with the inverting terminal being still kept at Vcm, charge Qamp2 due to charge sharing between the capacitors Cb and Cfb can be expressed in equation (4) as follows.

$$Qamp2 = (Vcm - Vx) \times Cb + (Vcm - Vo) \times Cfb \quad \text{equation (4)}$$

According to the law of charge conservation, the magnitude of charge stored in the first phase illustrated in FIG. 3A is equal to that in the second phase in the presence of the touch event illustrated in FIG. 3B. That is, as far as node X is concerned, Qx1 of equation (1) equals Qx2 of equation (3), as further expressed in equation (5):

$$V5 \times (Cfinger + Cp1) = Vx \times (Cfinger + Cp1 + Cp2 + Cb) \quad \text{equation (5)}$$

By rearranging equation (5), Vx can be determined in equation (6) below.

$$Vx = \frac{V5 \times (Cfinger + Cp1)}{Cfinger + Cp1 + Cp2 + Cb} \quad \text{equation (6)}$$

Further, as far as the inverting terminal is concerned, Qamp1 of equation (2) equals Qamp2 of equation (4), as further expressed in equation (7):

$$Vcm \times Cb = (Vcm - Vx) \times Cb + (Vcm - Vo) \times (Cb + Cfb) \quad \text{equation (7)}$$

By rearranging equation (7), Vx can be determined in equation (8) below.

$$Vx = \frac{Cfb \times (Vcm - Vo)}{Cb} \quad \text{equation (8)}$$

Based on equation (6) and equation (8), a voltage level (also denoted as Vo) at the output Vo of the amplifier 28 can be determined in equation (9) as follows.

$$Vo = Vcm - \frac{Cb}{Cfb} \times \frac{V5 \times (Cfinger + cp1)}{Cfinger + Cp1 + Cp2 + Cb} \quad (9)$$

In an embodiment according to the present invention, capacitances Cp1 and Cfinger are in the order of several femtofarads (fF). For example, the first parasitic capacitance Cp1 is few fF and the capacitance Cfinger is approximately 1 fF. In addition, the capacitance Cp2 is in the order of several tens of fF, and the capacitance Cfb is in the order of several femtofarads. Furthermore, the capacitor Cb has a predetermined capacitance in the order of several picofarads (pF). As previously discussed, the capacitance Cb is significantly larger than those of the capacitors Cfinger, Cp1 and Cp2. As a result, the term Cb in the numerator of equation (9) is substantially equal to the term (Cfinger+Cp1+Cp2+Cb) in the denominator of equation (9), and can cancel each other. Accordingly, Vo of equation (9) can be rewritten in equation (10) as follows.

$$Vo = Vcm - \frac{V5 \times (Cfinger + cp1)}{Cb} \quad (10)$$

An analog-to-digital (ADC) circuit (not shown) may be employed to sample the term $$\frac{V5 \times (Cfinger + cp1)}{Cb}$$

from the above equation (10). For example, the ADC circuit may be connected to the output Vo of the amplifier 28 and configured to perform Vcm-Vo (second phase). The term $$\frac{V5 \times (Cfinger + cp1)}{Cfb},$$

defined as the sensitivity of the fingerprint sensor 1, is directly proportional to V5 and inversely proportional to the capacitance Cfb. In addition, the sensitivity is independent of the second parasitic capacitance Cp2. Also, the sensitivity is independent of parasitic capacitance of the input terminals of the amplifier 28. Moreover, the sensitivity is a function of the capacitance Cfinger and the capacitance Cp1.

Although the first parasitic capacitance Cp1 is substantially inevitable in a fingerprint sensor design, the effect of capacitance Cp1 can be alleviated by a trimming method according to the present invention. In operation, a value of Vcm in reality (hereinafter the "real Vcm") is measured. Next, a value of Vo_trim in the second phase in the absence of a touch event, i.e., Cfinger is zero, is trimmed to the real Vcm by an offset cancellation circuit (not shown) that may be configured in the amplifier 28. The trimming process can be expressed in equation (11) below.

$$Vo\_trim = Vcm - \frac{Cb}{Cfb} \times \frac{V5 \times (0 + cp1)}{0 + Cp1 + Cp2 + Cb} \pm Voffset \quad (11)$$

where Voffset represents an amount of offset provided by the offset cancellation circuit to cancel the effect of the first parasitic capacitance Cp1, expressed in the term of $$\frac{Cb}{Cfb} \times \frac{V5 \times (0 + cp1)}{0 + Cp1 + Cp2 + Cb}$$

in the above equation (11). After trimming, ideally Vo_trim reaches a value of the real Vcm.

Subsequently, the ADC circuit samples [real Vcm-Vo (with Cfinger in the second phase)]. Effectively, with the effect of Cp1 in equation (10) having been canceled, a desirable sensitivity $$\frac{V5 \times (Cfinger)}{Cfb}$$

of the fingerprint sensor 1 is achieved.

As a result, after trimming, the sensitivity of the fingerprint sensor 1 is independent of the parasitic capacitances Cp1 and Cp2. In addition, since the sensitivity is directly proportional to V5, a relatively large signal can be expected.

Figure 4A:
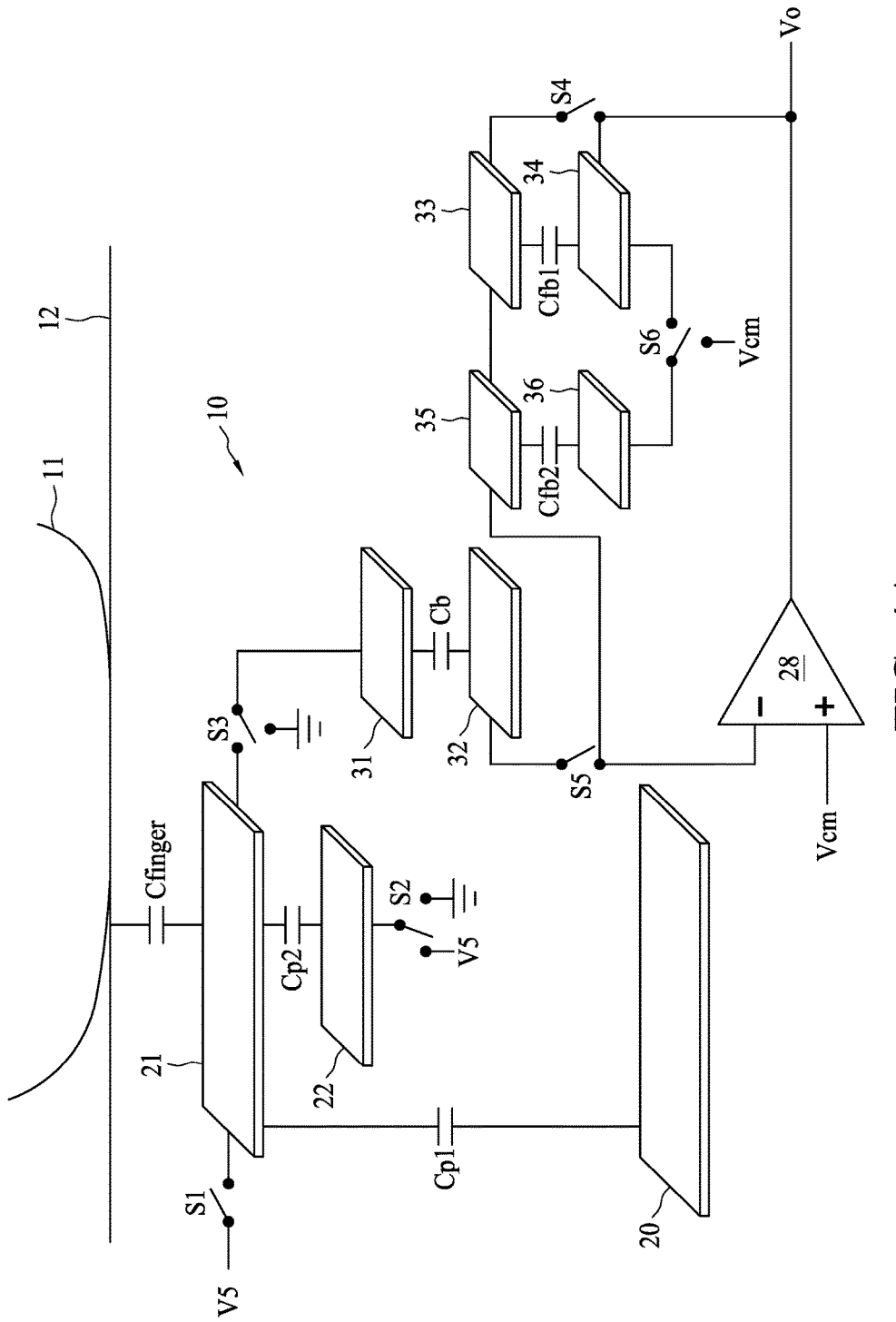
FIG. 4A is a schematic diagram of an exemplary sensing element of the fingerprint sensor shown in FIG. 1, in accordance with another embodiment of the present invention.

FIG. 4A is a schematic diagram of an exemplary sensing element 10 of the fingerprint sensor 1 shown in FIG. 1, in accordance with another embodiment of the present invention.

Referring to FIG. 4A, the structure of the sensing element is similar to that described and illustrated with reference to FIG. 2A except that, for example, a third pair of conductive plates 35, 36 and switches S5, S6 are added. Specifically, the conductive plate 32 of the first pair is coupled to the inverting terminal of the amplifier 28 via a fifth switch S5. The conductive plate 35 of the third pair is coupled to the inverting terminal and, via the fifth switch, to the conductive plate 32. Moreover, the conductive plate 35 is coupled to the conductive plate 33 of the second pair, while the conductive plate 36 is coupled via a sixth switch S6 to the conductive plate 34 of the second pair. Furthermore, the second pair of conductive plates 33 and 34 defines a capacitance Cfb1 therebetween, and the third pair of conductive plates 35 and 36 defines a capacitance Cfb2 therebetween. As a result, when the conductive plate 36 and the conductive plate 34 are coupled via the sixth switch S6, the capacitors Cfb1 and Cfb2 are connected in parallel with each other.

Figure 4B:
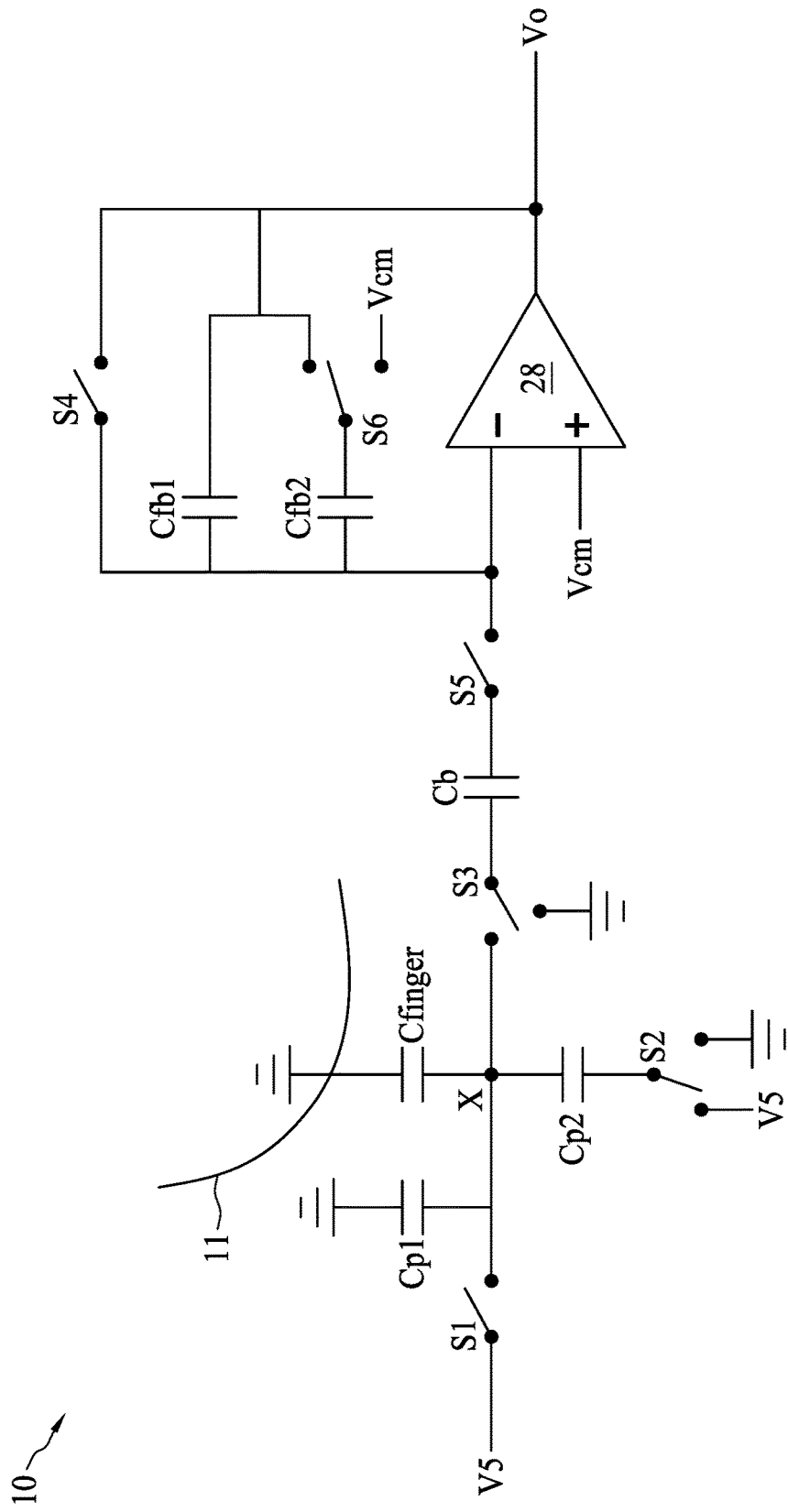
FIG. 4B is a circuit diagram of an equivalent circuit of the exemplary sensing element shown in FIG. 4A, in accordance with some embodiments of the present invention.

FIG. 4B is a circuit diagram of an equivalent circuit of the exemplary sensing element 10 shown in FIG. 4A, in accordance with some embodiments of the present invention.

Referring to FIG. 4B, the capacitor Cb is coupled to the inverting terminal when the fifth switch S5 is closed, and is disconnected from the inverting terminal when the fifth switch SS5 is released. In addition, the sixth switch S6 selectively couples the capacitors Cfb1 and Cfb2 in parallel between the inverting terminal and the output Vo of the amplifier 28, or couples the capacitor Cfb2 to Vcm. In an embodiment, when coupled in parallel, the resultant capacitance of the capacitors Cfb1 and Cfb2 equals Cfb as described and illustrated with reference to FIG. 2B.

Figure 5A:
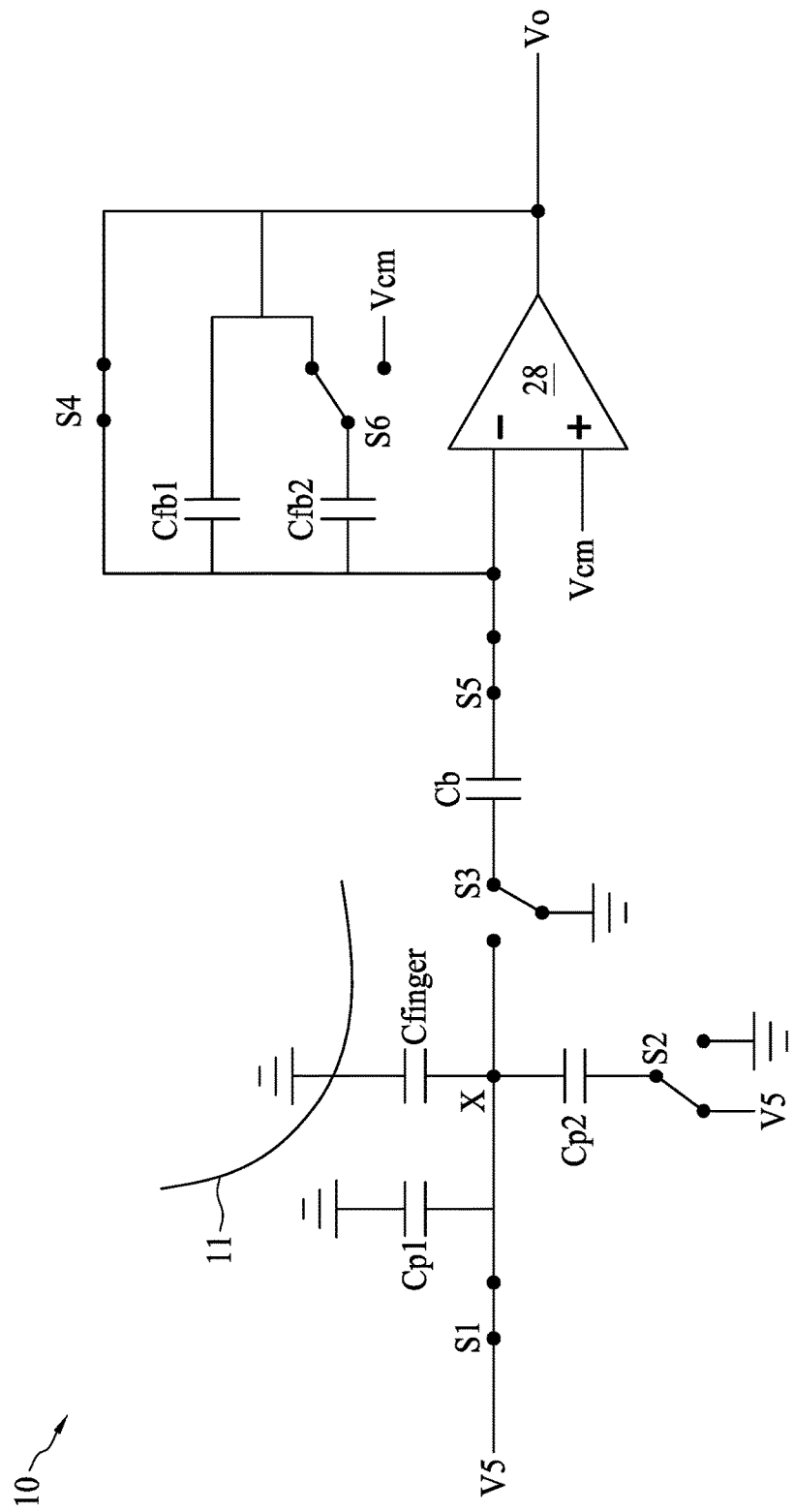
FIG. 5A is a circuit diagram of the exemplary sensing element shown in FIG. 4A, operating in a first phase in the presence of a touch event, in accordance with some embodiments of the present invention.

FIG. 5A is a circuit diagram of the exemplary sensing element 10 shown in FIG. 4A, operating in a first phase in the presence of a touch event, in accordance with some embodiments of the present invention.

Referring to FIG. 5A, during the first phase the switches S1 to S4 operate in a same fashion as in FIG. 3A, the fifth switch S5 is closed and the sixth switch S6 couples the capacitors Cfb1 and Cfb2 in parallel. Since the third switch S3 is coupled to ground, the capacitor Cb is disconnected from the node X. As far as node X is concerned, charge Qx1' from the input voltage V5 is stored in the capacitors Cp1 and Cfinger, and can be expressed in a same equation as the above-mentioned equation (1). Moreover, since the fourth switch S4 is closed, the capacitors Cfb1 and Cfb2 connected in parallel are bypassed. As far as the inverting terminal of the amplifier 28 is concerned, charge Qamp1' from the inverting terminal that is virtual-shorted to Vcm is stored in the capacitor Cb, and can be expressed in a same equation as the above-mentioned equation (2).

Figure 5B:
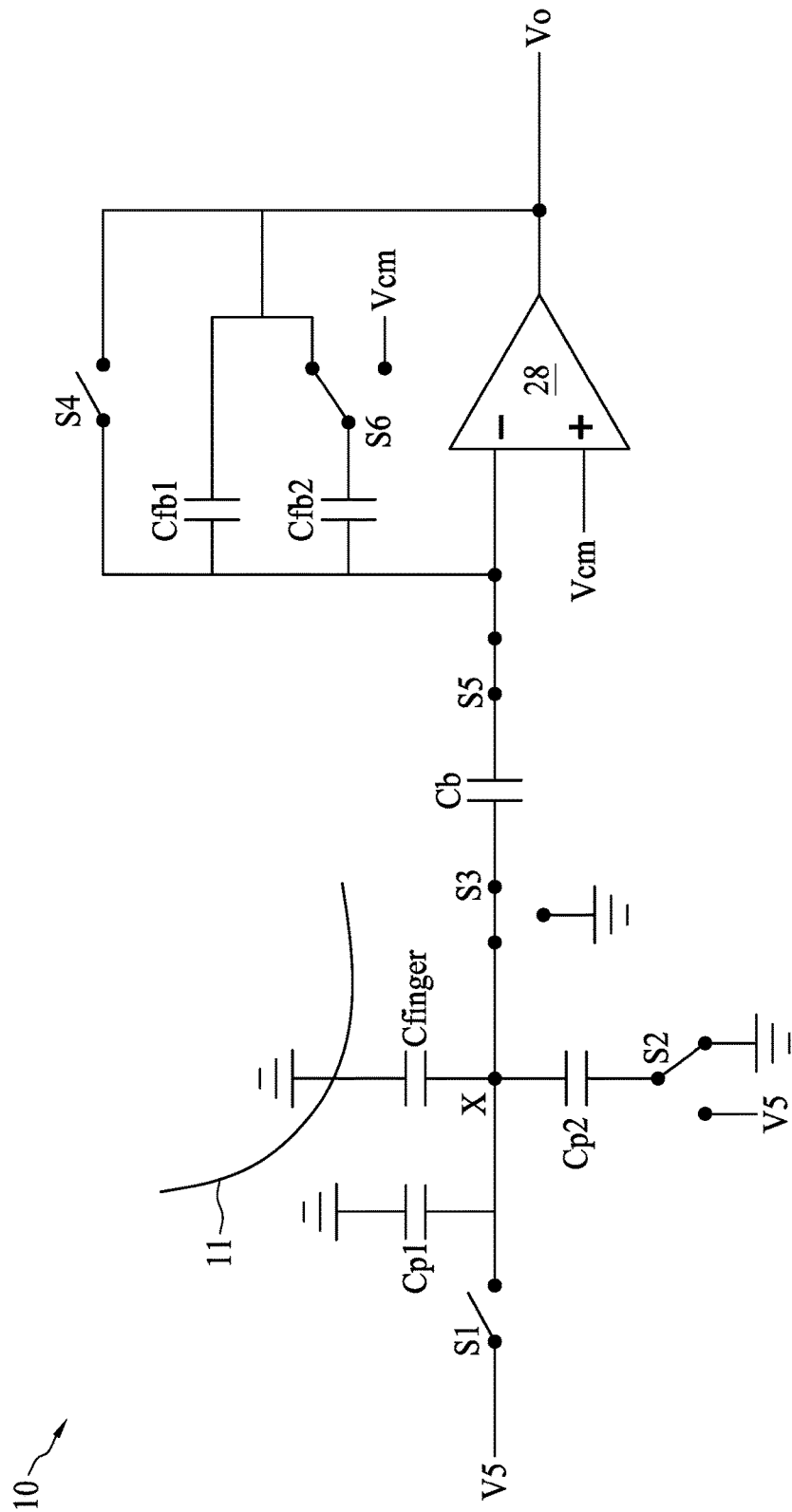
FIG. 5B is a circuit diagram of the exemplary sensing element shown in FIG. 4A, operating in a second phase in the presence of a touch event, in accordance with some embodiments of the present invention.

FIG. 5B is a circuit diagram of the exemplary sensing element 10 shown in FIG. 4A, operating in a second phase in the presence of a touch event, in accordance with some embodiments of the present invention.

Referring to FIG. 5B, during the second phase the switches S1 to S4 operate in a same fashion as in FIG. 3B, and the switches S5 and S6 stay at the same connection states as in FIG. 5A. As a result, as far as node X is concerned, with the inverting terminal being still kept at Vcm, charge Qx2' due to charge sharing among the capacitors Cp1, Cfinger, Cp2 and Cb can be expressed in a same equation as the above-mentioned equation (3). Moreover, as far as the inverting terminal of the amplifier 28 is concerned, with the inverting terminal being still kept at Vcm, charge Qamp2' due to charge sharing between the capacitors Cb and the parallel-connected capacitors Cfb1 and Cfb2 can be expressed in equation (12) as follows.

$$Qamp2'=(Vcm-Vx)\times Cb+(Vcm-Vo)\times (Cfb1+Cfb2) \quad \text{equation (12)}$$

Qamp2' in equation (12) is similar to Qamp2 in equation (4) except that the term (Cfb1+Cfb2) replaces Cfb. According to the law of charge conservation, the magnitude of charge stored in the first phase illustrated in FIG. 5A is equal to that in the second phase in the presence of the touch event illustrated in FIG. 5B. That is, as far as node X is concerned, Qx1' in the first phase equals Qx2' in the second phase. The relationship between Vx and V5 can be expressed in same equations as the above-mentioned equations (5) and (6).

Further, as far as the inverting terminal is concerned, Qamp1' in the first phase equals Qamp2' of equation (12) in the second phase. By replacing Cfb with (Cfb1+Cfb2) in equations (7) and (8), a voltage level (denoted as Vo2) at the output Vo of the amplifier 28 in equation (9) can be rewritten in equation (13) as follows.

$$Vo2 = Vcm - \frac{Cb}{(Cfb1+Cfb2)} \times \frac{V5 \times (Cfinger+cp1)}{Cfinger+Cp1+Cp2+Cb} \quad (13)$$

As previously discussed, the term Cb in the numerator of equation (13) is substantially equal to the term (Cfinger+ Cp1+Cp2+Cb) in the denominator of equation (13), and can cancel each other. Moreover, by a trimming method as previously discussed, the effect of the parasitic capacitance Cp1 is alleviated.

Figure 5C:
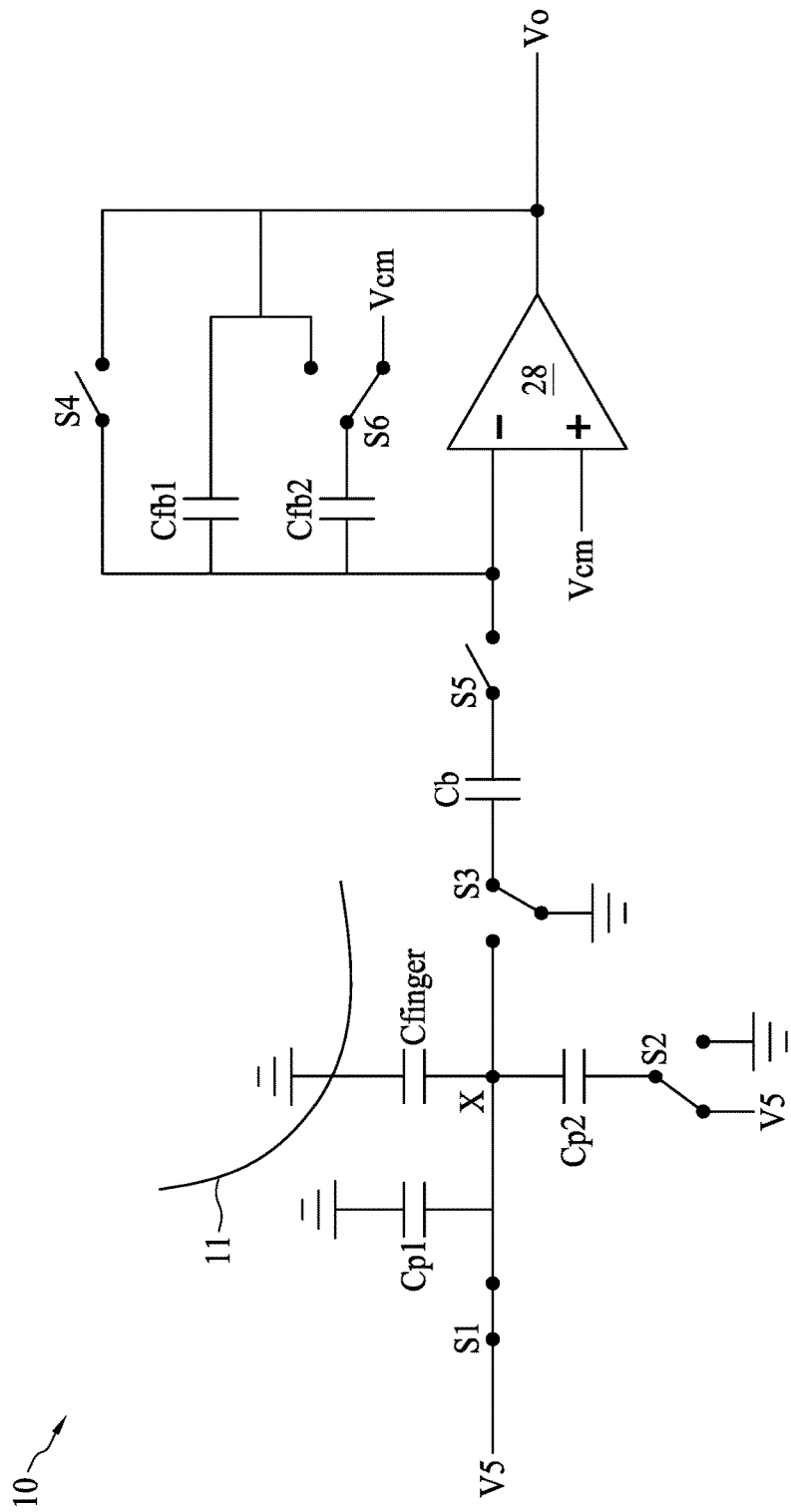
FIG. 5C is a circuit diagram of the exemplary sensing element shown in FIG. 4A, operating in a third phase in the presence of a touch event, in accordance with some embodiments of the present invention.

FIG. 5C is a circuit diagram of the exemplary sensing element 10 shown in FIG. 4A, operating in a third phase in the presence of a touch event, in accordance with some embodiments of the present invention.

Referring to FIG. 5C, during the third phase the switches S1 to S3 operate in a same fashion as in FIG. 5A, the switches S4 and S5 are released, and the sixth switch S6 couples the capacitor Cfb2 to Vcm. In operation, the fifth switch S5 is released before the sixth switch S6 is switched to Vcm so as to facilitate charge sharing from Cfb2 to Cfb1. Since the fifth switch S5 is released, the capacitor Cb is disconnected from the inverting terminal. Moreover, since the sixth switch S6 is coupled to Vcm, both ends of the capacitor Cfb2 are coupled to Vcm. Accordingly, no voltage is applied across the capacitor Cfb2 and thus no charge can be stored therein. As a result, as far as the inverting terminal is concerned, with the inverting terminal being still kept at Vcm, a voltage level (denoted as Vo3) at the output Vo of the amplifier 28 is expressed in equation (14) below.

$$Vo3 = \frac{(Cfb1+Cfb2)}{Cfb1} \times (Vo2-Vcm) \quad \text{equation (14)}$$

The capacitance Cfb2 is a predetermined times of the capacitance Cfb1. In an embodiment, the capacitance Cfb2 is three times the capacitance Cfb1. For example, the capacitance Cfb2 is approximately 22.5 fF and the capacitance Cfb1 is approximately 7.5 fF. As a result, in equation (14) the numerator (Cfb1+Cfb2) is four times the denominator Cfb1, which substantially increases signal amplification by approximately four folds.

The sensitivity, $$\frac{V5 \times (Cfinger+cp1)}{Cfb},$$

as previously discussed with reference to FIGS. 3A and 3B, is inversely proportional to the capacitance Cfb. Apparently, a smaller Cfb may result in a higher sensitivity. However, an unexpectedly small Cfb is likely to cause non-uniform capacitance in adjacent pixels. For example, with respect to a certain pixel, its adjacent pixels may have different values of Cfb. Consequently, the sensitivity is adversely affected.

With the capacitances Cfb1 and Cfb2, charge is stored in the first phase and the second phase when Cfb1 and Cfb2 are connected in parallel to form a capacitor having a larger capacitance that may equal Cfb. Effectively, the larger capacitor prevents the risk of the uniformity issue that would otherwise occur in a significantly small capacitor in an attempt to obtain a higher sensitivity. Subsequently, in the third phase only the capacitor Cfb1 works, by function of charge sharing, an amplification ratio of $$\frac{(Cfb1+Cfb2)}{Cfb1}$$

is achieved.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A fingerprint sensor, comprising:
a sensing electrode configured to detect a capacitance in response to a touch event on the fingerprint sensor, and configured to selectively receive or not receive an input voltage;
a shielding plate, between the substrate and the sensing electrode, configured to selectively receive the input voltage or is coupled to a reference voltage level;
a first pair of conductive plates including a first plate selectively coupled to the sensing electrode; and
an amplifier including an inverting terminal coupled to a second plate of the first pair of conductive plates, and a non-inverting terminal to receive a voltage that is a fraction of the input voltage,
wherein sensitivity of the fingerprint sensor is directly proportional to the input voltage.

2. The fingerprint sensor of claim 1, wherein the first pair of conductive plates defines a capacitor having a capacitance significantly larger than a first parasitic capacitance associated with the sensing electrode, and a second parasitic capacitance between the sensing electrode and the shielding plate.

3. The fingerprint sensor of claim 2, wherein the sensitivity of the fingerprint sensor is independent of the second parasitic capacitance.

4. The fingerprint sensor of claim 1 further comprising a second pair of conductive plates coupled between the inverting terminal and an output of the amplifier, wherein the second pair of conductive plates defines a feedback capacitor, and the sensitivity of the fingerprint sensor is inversely proportional to a capacitance of the feedback capacitor.

5. The fingerprint sensor of claim 4, wherein the feedback capacitor includes a first capacitor coupled between the inverting terminal and an output of the amplifier, and a second capacitor selectively coupled in parallel with the first capacitor.

6. The fingerprint sensor of claim 5, wherein a capacitance of the second capacitor is a predetermined times of that of the first capacitor.

7. The fingerprint sensor of claim 5, wherein the sensitivity of the fingerprint sensor is directly proportional to a ratio of (Cfb1+Cfb2)/Cfb1, wherein Cfb1 and Cfb2 represent a capacitance each of the first capacitor and the second capacitor, respectively.

8. The fingerprint sensor of claim 4, wherein the second plate of the first pair of conductive plates is selectively coupled to the inverting terminal of the amplifier.

9. The fingerprint sensor of claim 1, wherein the sensitivity S of the fingerprint sensor is defined by the following equation:

$$S = \frac{V5 \times (Cfinger + cp1)}{Cfb}$$

where V5 represents the input voltage, Cfinger represents a capacitance detected by the sensing electrode, Cp1 represents a capacitance associated with the sensing electrode, and Cfb represents a capacitance between an inverting terminal and an output of the amplifier.

10. The fingerprint sensor of claim 9 further comprising an offset cancellation circuit to trim off Cp1.

11. The fingerprint sensor of claim 1, wherein the input voltage is provided without a metal ring or metal frame.

12. A circuit, comprising:
a sensing electrode configured to detect a capacitance in response to a touch event on a fingerprint sensor;
a node associated with the sensing electrode, the node configured to selectively receive an input voltage;
an amplifier including an inverting terminal, and a non-inverting terminal to receive a voltage that is a fraction of the input voltage; and
a capacitor configured to selectively couple to the node and selectively couple to the inverting terminal,
wherein sensitivity of the fingerprint sensor is directly proportional to the input voltage.

13. The circuit of claim 12 further comprising a shielding plate associated with the sensing electrode, wherein a sum of a first parasitic capacitance associated with the sensing electrode, a second parasitic capacitance between the sensing electrode and the shielding plate, and a capacitance detected by the sensing electrode is negligible relative to a capacitance of the capacitor.

14. The circuit of claim 13, wherein the sensitivity of the fingerprint sensor is independent of the second parasitic capacitance.

15. The circuit of claim 12 further comprising a feedback capacitor coupled between the inverting terminal and an output of the amplifier, wherein the sensitivity of the fingerprint sensor is inversely proportional to a capacitance of the feedback capacitor.

16. The circuit of claim 15, wherein the feedback capacitor includes a first capacitor coupled between the inverting terminal and an output of the amplifier, and a second capacitor selectively coupled in parallel with the first capacitor.

17. The circuit of claim 16, wherein a capacitance of the second capacitor is a predetermined times of that of the first capacitor.

18. The circuit of claim 16, wherein the sensitivity of the fingerprint sensor is directly proportional to a ratio of (Cfb1+Cfb2)/Cfb1, wherein Cfb1 and Cfb2 represent a capacitance each of the first capacitor and the second capacitor, respectively.

19. The circuit of claim 12, wherein the sensitivity S of the fingerprint sensor is defined by the following equation:

$$S = \frac{V5 \times (Cfinger + cp1)}{Cfb}$$

where V5 represents the input voltage, Cfinger represents a capacitance detected by the sensing electrode, Cp1 represents a capacitance associated with the sensing electrode, and Cfb2 represents a capacitance between an inverting terminal and an output of the amplifier.

20. The circuit of claim 12, wherein the input voltage is provided without a metal ring or metal frame.

* * * * *